Dec. 28, 1965 J. M. WALLACE 3,226,463

METHODS OF MAKING CIRCUIT COMPONENTS

Filed April 10, 1961

JOSEPH M. WALLACE
INVENTOR.
KENDRICK, SCHRAMM & STOLZY
BY A. Donald Stolzy
ATTORNEYS 3,226,463
Patented Dec. 28, 1965

3,226,463

METHODS OF MAKING CIRCUIT COMPONENTS

Joseph M. Wallace, 5617 Corryne Place,
Culver City, Calif.

Filed Apr. 10, 1961, Ser. No. 101,695
1 Claim. (Cl. 264—272)

This invention relates to plastic covered circuit elements and methods of manufacturing them.

Although one method disclosed herein relates to covering miniaturized diodes with a plastic material, the present invention will have a much larger scope of application as will be apparent from the description of its application to diodes.

According to the prior art, conductor leads are soldered to leads from a circuit element. The conductor leads must, of course, have bare wire ends as must leads from the circuit element in order to make an appropriate electrical connection and in particular since the method of connection involves soldering them together.

In the prior art the necessity of a rigid mounting board for some circuit elements was obviated by connecting miniaturized elements in series with a conductor lead, a plurality of which could be tied together in a cable. However, this mode of circuit element use requires insulation to be provided on the bare wire ends of both the conductor and circuit element leads of a thickness sufficient to prevent arcing between them and any adjacent conductor. According to the prior art this is accomplished by threading one of two conductor leads soldered to each end of a circuit element through a small hole in the bottom of a dielectric cup, stuffing the circuit element and all the bare wire ends of both the conductor and circuit element leads into the cup, and manually pouring the liquid plastic dielectric into the cup, the plastic being of a composition that cures to a solid state upon the application of heat.

The above-described prior art method is fraught with several serious disadvantages. In the first place, air bubbles frequently are lodged in the manually poured liquid plastic. This is due not only to the nature of the material and its relatively high viscosity, but also to the nature of the tortuous path it must follow to flow around and between the circuit element and the bare wire ends of both the conductor and circuit element leads and between them and the cup.

The existence of air bubbles in the manually poured plastic of the prior art itself causes several problems. The first of these is that it increases the essential amount of plastic material which must be used. That is, air bubbles make the plastic inhomogenous and hence reduce the overall dielectric strength of the plastic as a unit. Thus, an abundant supply must be used as a safety measure to insure that adequate electrical insulation is provided.

The large size of the plastic coating required for a circuit element according to the prior art also makes electrical circuit element heat dissipation difficult and a product especially bulky to handle in a miniaturized electrical system.

The existence of air bubbles also increases the electrical hazard of water absorption. Water absorption, of course, is undesirable in that the dielectric strength of undistilled water is relatively non-existent and arcing can easily initiate. Plastic air bubbles near the plastic surface can be punctured to increase the chances of water absorption, but water absorption can take place without this condition simply due to aging of the thin wall due to air bubbles near the surface of the plastic.

Another disadvantage of the manually poured plastic of the prior art is non-uniform length. Due to the high viscosity of the plastic, a cup must be filled to overflowing as a time saving measure without waiting until the plastic seeks the level of the top of the cup. The existence of air bubbles and the lack of them make the cured plastic protrude from the cups different distances. Hence the cured plastic must be carved to a uniform size and especially to fit in miniaturized electrical systems.

Still further the use of the plastic cup in series with a conductor lead tied in a cable is disadvantageous to the extent that its sharp edges chafe adjacent conductor lead insulation.

The present invention overcomes the above-described and other disadvantages of the prior art by providing a particular method of making a component for connection in an electrical circuit, this method including the steps of connecting one bare wire end of at least two conductor leads to at least two corresponding bare wire ends from a circuit element, placing the connections of the leads in a mold, injecting a dielectric material into the mold to surround the connections, and curing the dielectric material in a manner to cause it to harden.

Use of the foregoing method eliminates air bubbles because by the use of a pressure molding method, the existence of air bubbles is prevented. Thus, the attendant disadvantages upon the existence of air bubbles no longer exist in accordance with the method of the present invention. In particular, the size of the plastic coating for the circuit element and the bare wire lead connections may be kept extremely small, the size always being the size of the mold in which the plastic is cast. The mold, of course, is designed to provide a sufficient amount of plastic to provide a sufficient insulation wall thickness for a particular voltage rating or specification.

The fact that size is not a problem in accordance with the method of the invention, heat dissipation and bulk are no longer problems. Water absorption due to air bubbles is prevented, and all circuit components made in accordance with the method of the invention have uniform dimensions to fit in miniaturized electrical systems.

In pressure molding a plastic dielectric material around a circuit element and around bare wire ends of both conductor leads and circuit element leads, a problem still exists in maintaining a sufficient amount of plastic insulation thickness along the complete lengths of the bare wire ends of the conductor and circuit element leads. In accordance with an outstanding feature of the present invention, this problem is solved by a method including the steps of connecting one bare wire end of each of at least two conductor leads to each of at least two corresponding bare wire ends of leads from a circuit element, placing a dielectric sleeve around the circuit element in a position to surround the connections of the leads as well, placing the circuit element with the sleeve therearound and the bare wire connections in a mold, and injecting a heated liquid plastic dielectric material into the mold under pressure to surround the connections for a time sufficient to cure the liquid plastic dielectric material to a solid state.

The method of the invention which overcomes the problem of pressure molding by the use of the dielectric sleeve prevents the bare wire ends of the conductor and circuit element leads from flexing, and they are generally flexible, especially those employed in connecting miniaturized circuit elements. Flexing of the bare wire ends, of course, might mean that the bare wire ends themselves could come close, if not in contact, with the internal mold cavity and in that position, remain substantially uninsulated. It is to be noted that this can be a special problem in view of the fact that plastic pressure molding may take place at extremely high pressures.

Although, in accordance with the method of the invention employing a dielectric sleeve, it may generally be necessary, as a practical matter, to form the sleeve by cutting plastic tube in a manner such that it will have sharp edges, the same will be molded internally of the plastic surrounding it in the mold and the edges of the sleeve will not thereby chafe the insulation of any adjacent conductors that may be so located when the circuit component made in accordance with the method of the invention is assembled in a miniaturized electrical system.

Still further, in accordance with another feature of the invention, the ends of the product of the method of the present invention are rounded approximately in the shape of one quarter of a torus. For this additional reason, chafing of insulation on adjacent conductor leads is prevented when the circuit component of the present invention is tied in with a plurality of other leads in a cable.

The above-described and other advantages of the present invention will be better understood from the following description considered in connection with the accompanying drawings which are to be regarded as merely illustrative.

Figure 1:
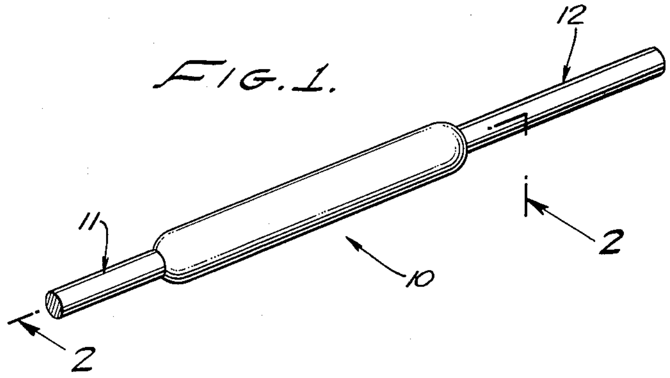
FIG. 1 is a perspective view of a plastic covered circuit component.

In the drawings in FIG. 1, a plastic covered circuit component 10 is shown having conductor leads 11 and 12 emanating from opposite ends thereof. A circuit element is indicate at 13 in FIG. 2.

Figure 2:
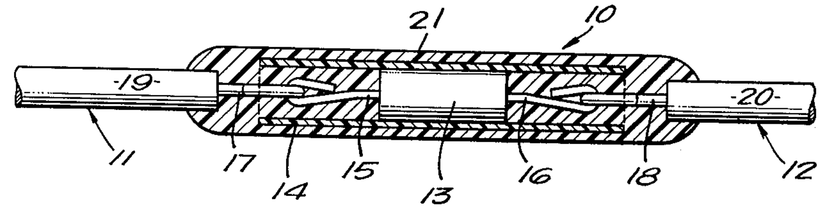
FIG. 2 is a sectional view of the circuit component taken on the line 2—2 shown in FIG. 1.

In FIG. 2 it will be noted that a hollow cylindrical plastic sleeve 14 surrounds circuit element 13 and extends beyond each end thereof to surround bare wire ends 15 and 16 of circuit element 13 and bare wire ends 17 and 18 of conductor leads 11 and 12, thus surrounding the electrically conducting joint or connection between the ends 15 and 17 and the joint or connection between the ends 16 and 18. Conductor leads 11 and 12 are provided with insulation at 19 and 20, respectively. A solid plastic material 21 also is shown in FIG. 2 which surrounds not only circuit element 13, bare wire ends 15, 16, 17 and 18, and plastic sleeve 14 itself, but also portions of insulation at 19 and 20 which terminate adjacent corresponding bare wire ends 17 and 18, respectively.

As is conventional, bare wire ends 15 and 17 are soldered together as are bare wire ends 16 and 18 to join them conductively.

Note will be taken that the ends of plastic material 21 over insulation 19 and 20 resemble the shape of a quarter of a torus. This rounded surface permits several components 10 to be strung together in a cable without any sharp edges on one component chafing the insulation of adjacent ones.

Sleeve 14 is positioned around circuit element 13 before pressure molding of the plastic material 21 takes place. For reasons explained hereinbefore, sleeve 14 may desirably fit circuit element 13 tightly although that is not necessarily the case. Thus, the body of circuit element 13 may also be cylindrical to conform to the cylindrical internal surface of plastic sleeve 14. In particular, circuit element 13 may be a semiconductor diode which generally has a body of a cylindrical shape.

One reason that plastic sleeve 14 is used is to improve the pressure molding method of the invention even though conductor leads 11 and 12 generally and bare wire ends 15, 16, 17 and 18 in particular are normally flexible, as explained previously and as is the usual case especially in connection with leads to miniaturized circuit elements which are normally relatively small in cross-section.

Although the mold employed to perform the method of the present invention is specially designed in some respects, it is conventional in that conventional plastic molding materials and mold materials themselves are employed at conventional pressures and temperatures.

Figure 3:
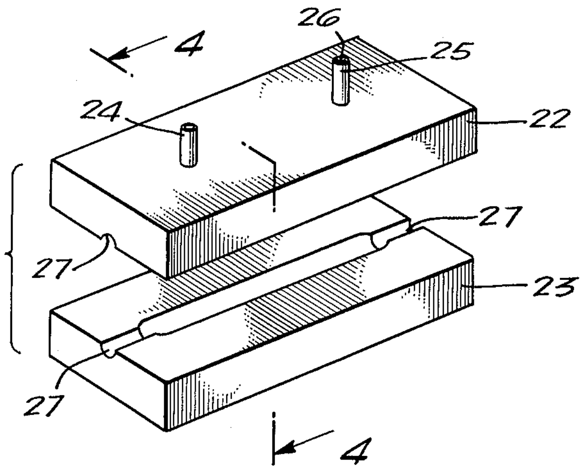
FIG. 3 is a perspective view of two halves of a mold in which a plastic material is dispersed around the circuit component.
Figure 4:
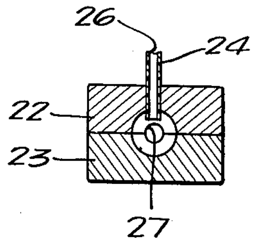
FIG. 4 is a sectional view of one half of the mold taken on the line 4—4 shown in FIG. 3.

Upper and lower mold halves employed with the method of the present invention are illustrated at 22 and 23, respectively, in FIG. 3. Both are identical except for plastic tubes 24 and 25 which are inserted through appropriate holes in upper mold half 22, one such hole being indicated at 26 in FIG. 4. Mold halves 22 and 23 have cavities to conform to the shape of plastic material 21 shown in FIGS. 1 and 2 except that cylindrical recesses 27 are provided therein at the opposite ends of each.

Although the method of the present invention is by no means limited to the exact steps to be described hereinafter, the method of be described is one suitable method of the invention.

In the first step, bare wire ends 15 and 17 are soldered together and then bare wire ends 16 and 18 are soldered together. Plastic sleeve 14 is then located over circuit element 13 in the position shown in FIG. 2. Circuit element 13 and bare wire ends 15, 16, 17 and 18 are then placed approximately in the center of the large central cavity of lower mold half 23 with the ends of insulation at 19 and 20 adjacent bare wire ends 17 and 18, respectively, projecting into the cavity. The mold is then closed and a Dupont Zytel 101 pressure molding plastic material, indicated at 21 in FIG. 2, is heated to about 560° F., at which temperature it exists in a liquid phase, and is injected into the cavities of mold halves 22 and 23 through tubes 24 and 25 at a pressure of about 9,000 pounds per square inch until the mold cavities are filled and the plastic material 21 is cured to a solid state.

As stated previously, plastic sleeve 14 prevents bare wire ends 15, 16, 17 and 18 from coming into contact with the walls of the cavities of mold halves 22 and 23. Hence, it is insured that these bare wire ends will have sufficient insulation around them in the form of plastic material 21 even though the high flexibility of bare wire ends 15, 16, 17 and 18 may permit circuit element 13 to move around in the cavities with the bare wire ends connected thereto while the same are under a relatively high pressure in the mold cavities. The tightness of plastic sleeve 14 on circuit element 13 may also improve this function if such a construction is employed.

As an added advantage, if a pressure molding plastic, such as Dupont Zytel 101 is employed, the same will mechanically and chemically bond to such as, for example, plastic insulation at 19 and 20, to plastic sleeve 14, to circuit element 13 and to bare wire ends 15, 16, 17 and 18 to provide a hermetically sealed circuit component 10.

From the foregoing, it will be appreciated that the method of the present invention provides a circuit component 10 having substantial advantages over that produced by the manually pouring method employed in the prior art. In particular, pressure molding prevents the existence of air bubbles in the plastic material 21. Air bubbles do not make necessary a size problem as do these circuit components made by the prior art method. Since size is not a problem, neither are heat dissipation or bulky leads in the use of circuit component 10 in miniaturized electrical systems. Still further, water absorption is not a problem in that the existence of air bubbles is prevented. Still further, the circuit components 10 made in accordance with the method of the present invention are uniform in size, the same conforming to the shape of the cavities of mold halves 22 and 23.

Notwithstanding the fact that plastic sleeve 14 may have sharp edges, the fact that it is covered up with plastic material 21 means that insulation of adjacent conductor leads will not be chafed thereby. Likewise, the one quarter toroidal shape of the ends of the plastic material 21 shown in FIG. 2 prevents the same undesirable condition.

As stated previously, the use of plastic sleeve 14 is not disadvantages, and particularly, is an outstanding advantage of the present invention in that bare wire ends 15, 16, 17 and 18 are uniformly covered with a desired thickness of plastic material 21 in that plastic sleeve 14 holds circuit element 13 and the connections thereto generally centrally of the cavity of mold halves 22 and 23, even though bare wire ends 15, 16, 17 and 18 and conductor leads 11 and 12 may be relatively flexible leads to a miniaturized circuit element or diode 13, which under the high pressure in the mold, would normally tend to distort in shape and move toward the surfaces of the cavities of mold halves 22 and 23.

Although only one specific embodiment of the method and product of the invention have been described and illustrated hereinbefore, the invention is not to be so limited, the true scope of the invention being defined in the appended claim.

What is claimed is:

The method of forming a circuit element having first and second longitudinally extending bare wire leads into an encapsulated component for connection in an electrical circuit, which method comprises the steps of electrically connecting a flexible bare wire end of an insulated conductor to the end of one of the bare wire leads from the circuit element, electrically connecting a flexible bare wire end of a second insulated conductor lead to the end of the other bare wire lead from the circuit element, placing a rigid dielectric sleeve around said circuit element, placing said element, said sleeve, and said bare wire ends in a mold with the sleeve projecting beyond both ends of the circuit element and surrounding the bare wire ends and the electrical connection formed thereon with the leads holding the element in spaced relationship in a mold and the element in turn holding the sleeve in the mold in spaced relationship to the surfaces thereof, while injecting a liquid plastic material under pressure into said mold to flow into and around said sleeve and in a manner to cure the liquid plastic material in a solid state.

References Cited by the Examiner

UNITED STATES PATENTS

| | | | |
|---|---|---|---|
| 2,312,652 | 3/1943 | Komives et al. | |
| 2,444,075 | 6/1948 | Violette | 18—59 |
| 2,526,688 | 10/1950 | Robinson | 18—59 |
| 2,577,005 | 12/1951 | Di Giacomo | 174—52.6 |
| 2,662,930 | 12/1953 | Morelock | 174—52.6 |
| 2,674,646 | 4/1954 | Schoch | 174—52.6 |
| 2,713,700 | 7/1955 | Fisher | 18—59 |
| 2,803,054 | 8/1957 | Kohring | 18—59 |
| 2,921,113 | 1/1960 | Clemons | 174—52.5 |
| 2,930,835 | 3/1960 | Bollmeier | 174—76 |
| 3,132,196 | 5/1964 | Veatch | 264—272 |
| 3,142,716 | 7/1964 | Gardener | 264—272 |

FOREIGN PATENTS

| | | |
|---|---|---|
| 574,139 | 12/1945 | Great Britain. |
| 66,972 | 6/1948 | Denmark. |

OTHER REFERENCES

Service: May, 1953, pages 50, 51, 114 relied upon.
German printed application, N6,225, March 1956.

ROBERT F. WHITE, *Primary Examiner.*

BENNETT G. MILLER, ALEXANDER H. BRODMERKEL, *Examiners.*